(12) United States Patent
Zhou et al.

(10) Patent No.: US 12,430,348 B2
(45) Date of Patent: Sep. 30, 2025

(54) LOG DATA QUERY METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Runyun Zhou, Shenzhen (CN); Zhaoxiang Lin, Shenzhen (CN); Xianbin Wu, Shenzhen (CN); Jian Wang, Shenzhen (CN); Wenshuang Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/602,509

(22) Filed: Mar. 12, 2024

(65) Prior Publication Data
US 2024/0211483 A1 Jun. 27, 2024

Related U.S. Application Data

(63) Continuation of application No. PCT/CN2023/092092, filed on May 4, 2023.

(30) Foreign Application Priority Data

Jul. 20, 2022 (CN) .......................... 202210862134.9

(51) Int. Cl.
*G06F 16/2458* (2019.01)
*G06F 16/22* (2019.01)

(52) U.S. Cl.
CPC ...... *G06F 16/2477* (2019.01); *G06F 16/2246* (2019.01)

(58) Field of Classification Search
CPC ............ G06F 16/2477; G06F 16/2246; G06F 16/148; G06F 16/13; G06F 16/1815
(Continued)

(56) References Cited

U.S. PATENT DOCUMENTS 6,374,249 B1 4/2002 Joslin et al.
11,030,174 B1 * 6/2021 Hagerup ............. G06F 16/2246
(Continued)

FOREIGN PATENT DOCUMENTS

| CN | 105630914 A | 6/2016 |
|---|---|---|
| CN | 106649627 A | 5/2017 |

OTHER PUBLICATIONS

The World Intellectual Property Organization (WIPO) International Search Report for PCT/CN2023/092092 Jul. 24, 2023 5 Pages (including translation).

*Primary Examiner* — Phong H Nguyen
(74) *Attorney, Agent, or Firm* — Anova Law Group, PLLC

(57) ABSTRACT

A log data query method includes determining a target node matching a query time range from a log query time tree, a node in the log query time tree being configured to record a time range for a log query; determining a target subtree from subtrees under the target node and configured to search for a boundary time value corresponding to the query time range; performing leaf node traversal from an edge leaf node of the target subtree, and stopping the leaf node traversal after a target leaf node is traversed, a time value, within a target time range recorded in the target leaf node, having corresponding log data in a disk; determining a time value recorded in the target leaf node having corresponding log data and in a critical state, for obtaining the boundary time value; and obtaining log data matching the query time range from the disk.

18 Claims, 8 Drawing Sheets

(58) Field of Classification Search
USPC .......................... 707/722, 725, 769, 770, 797
See application file for complete search history.

(56) References Cited

U.S. PATENT DOCUMENTS

| | | |
|---|---|---|
| 2004/0243553 A1 | 12/2004 | Bailey |
| 2006/0004715 A1 | 1/2006 | Lock et al. |
| 2006/0143206 A1* | 6/2006 | Lock ................... G06F 16/9027 |
| | | 707/999.101 |
| 2018/0336532 A1* | 11/2018 | Hillery ............... G06Q 10/1095 |
| 2021/0272069 A1* | 9/2021 | Douglas .............. G06F 16/9027 |

* cited by examiner

LOG DATA QUERY METHOD, ELECTRONIC DEVICE, AND STORAGE MEDIUM

CROSS-REFERENCES TO RELATED APPLICATIONS

The present disclosure is a continuation application of PCT Patent Application No. PCT/CN2023/092092, filed on May 4, 2023, which claims priority to Chinese Patent Application No. 2022108621349, filed on Jul. 20, 2022, all of which is incorporated herein by reference in their entirety.

FIELD OF THE TECHNOLOGY

The present disclosure relates to data query technologies and to the field of cloud technologies, and in particular, to a log data query method and apparatus, a device, and a medium.

BACKGROUND OF THE DISCLOSURE

Log data generated during daily service interactions is usually stored in a disk. Due to a large amount of the log data, the log data is most likely stored in a plurality of sectors of the disk, which brings great challenges to log data query. For example, if the disk is queried for log data within a certain time range through binary search, scattered access is easily caused. To be specific, during the binary search, since involved log data in a middle position is probably distributed in the plurality of sectors of the disk, a read and write operation needs to be performed on the corresponding sectors each time the log data located in the middle position is read. A plurality of read and write operations on the plurality of sectors take a long time, which results in low log data query efficiency.

SUMMARY

One aspect of the present disclosure provides a log data query method performed by a computer device. The method includes determining a target node matching a query time range from a log query time tree, a node in the log query time tree being configured to record a time range for a log query, and an intersection being between the time range recorded in the target node and the query time range; determining a target subtree from subtrees under the target node, the target subtree being configured to search for a boundary time value corresponding to the query time range; performing leaf node traversal from an edge leaf node of the target subtree, and stopping the leaf node traversal after a target leaf node is traversed, a time value, within a target time range recorded in the target leaf node, having corresponding log data in a disk; determining a time value recorded in the target leaf node having corresponding log data and in a critical state, for obtaining the boundary time value corresponding to the query time range; and obtaining log data matching the query time range from the disk based on the boundary time value.

Another aspect of the present disclosure provides a computer device. The computer device includes a memory and one or more processors, the memory containing computer-readable instructions that, when being executed, causes the one or more processors to perform: determining a target node matching a query time range from a log query time tree, a node in the log query time tree being configured to record a time range for a log query, and an intersection being between the time range recorded in the target node and the query time range; determining a target subtree from subtrees under the target node, the target subtree being configured to search for a boundary time value corresponding to the query time range; performing leaf node traversal from an edge leaf node of the target subtree, and stopping the leaf node traversal after a target leaf node is traversed, a time value, within a target time range recorded in the target leaf node, having corresponding log data in a disk; determining a time value recorded in the target leaf node having corresponding log data and in a critical state, for obtaining the boundary time value corresponding to the query time range; and obtaining log data matching the query time range from the disk based on the boundary time value.

Another aspect of the present disclosure provides a non-transitory computer-readable storage medium, containing computer-readable instructions, that when being executed causes one or more processors to perform: determining a target node matching a query time range from a log query time tree, a node in the log query time tree being configured to record a time range for a log query, and an intersection being between the time range recorded in the target node and the query time range; determining a target subtree from subtrees under the target node, the target subtree being configured to search for a boundary time value corresponding to the query time range; performing leaf node traversal from an edge leaf node of the target subtree, and stopping the leaf node traversal after a target leaf node is traversed, a time value, within a target time range recorded in the target leaf node, having corresponding log data in a disk; determining a time value recorded in the target leaf node having corresponding log data and in a critical state, for obtaining the boundary time value corresponding to the query time range; and obtaining log data matching the query time range from the disk based on the boundary time value.

Details of one or more embodiments of the present disclosure are provided in the following drawings and description. Other features, objectives, and advantages of the present disclosure become apparent from the specification, the drawings, and the claims.

BRIEF DESCRIPTION OF THE DRAWINGS

To describe technical solutions of embodiments of the present disclosure more clearly, drawings required for describing the embodiments are briefly described below. Apparently, the drawings in the following description show only some embodiments of the present disclosure, and a person of ordinary skill in the art can derive other drawings from the drawings without creative efforts.

DESCRIPTION OF EMBODIMENTS

To make objectives, technical solutions, and advantages of the present disclosure clearer, the present disclosure is further described in detail below with reference to drawings and embodiments. It is to be understood that, the specific embodiments described herein are merely used for explaining the present disclosure, and are not used for limiting the present disclosure.

Figure 1:
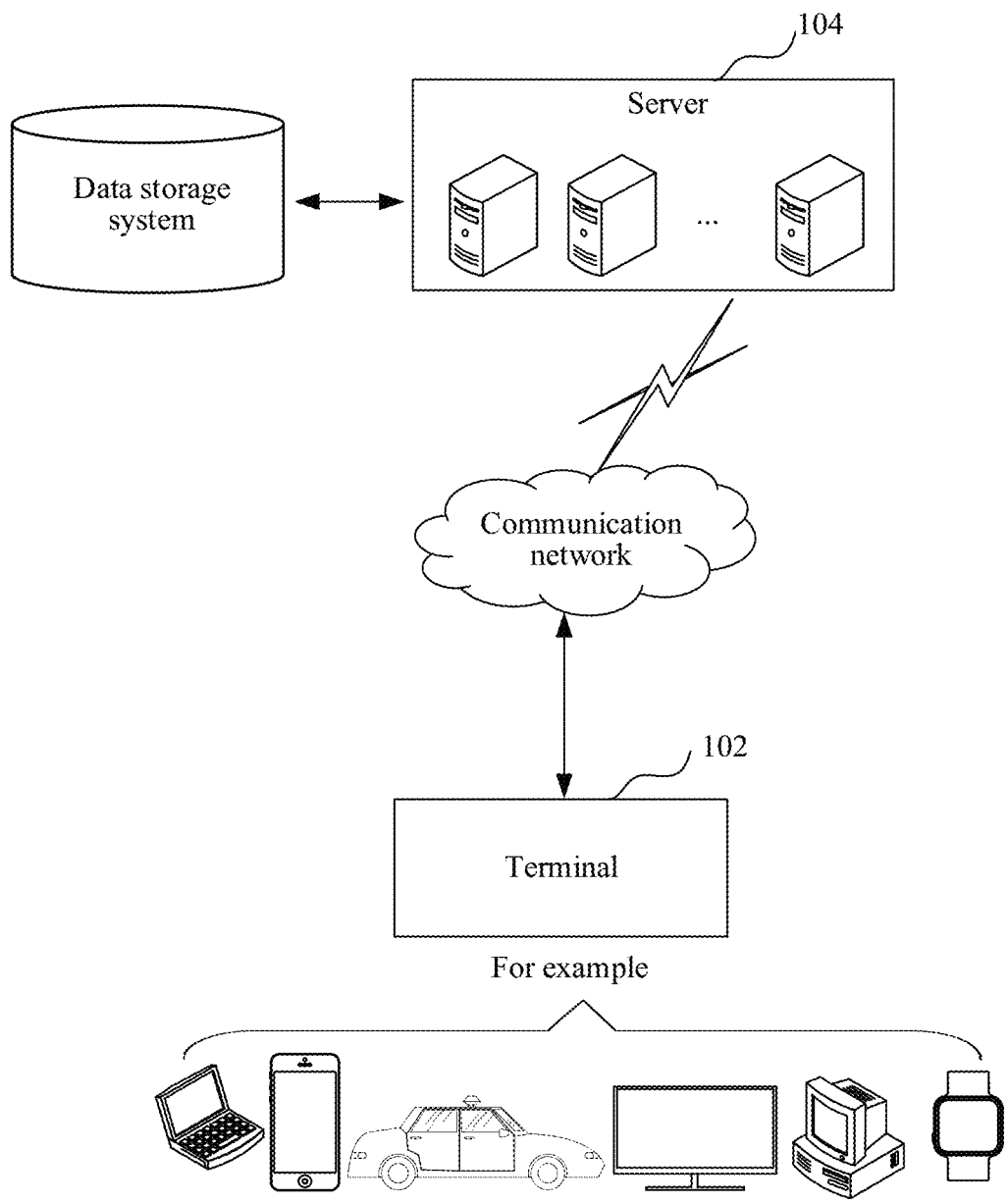
FIG. 1 is an application environment diagram of a log data query method according to an embodiment of the present disclosure.

A log data query method provided in the present disclosure may be applied to an application environment shown in FIG. 1. A terminal 102 communicates with a server 104 through a network. A data storage system can store data to be processed by the server 104. The data storage system may be integrated on the server 104, or may be arranged on the cloud or another server. The terminal 102 may be, but is not limited to, various desktop computers, laptops, smart phones, tablet computers, Internet of Things devices, and portable wearable devices. The Internet of Thing devices may be a smart speaker, a smart television, a smart air conditioner, a smart on-board device, and the like. The portable wearable devices may be a smartwatch, a smart bracelet, a headset, or the like. The server 104 may be an independent physical server, a server cluster formed by a plurality of physical servers, a distributed system, or a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal 102 and the server 104 may be directly or indirectly connected through wired or wireless communication, which is not limited in the present disclosure.

The server 104 can determine a target node matching a query time range from a log query time tree, each node in the log query time tree being configured to record a time range for a log query, and an intersection existing between the time range recorded in the target node and the query time range. The server 104 can determine a target subtree for searching for a boundary time value corresponding to the query time range from subtrees under a target node, and perform leaf node traversal from an edge leaf node of the target subtree, and stop the traversal after a target leaf node is traversed, a time value, within a target time range recorded in the target leaf node, having corresponding log data in a disk; The server 104 can determine a time value recorded in the target leaf node having corresponding log data and in a critical state, for obtaining the boundary time value corresponding to the query time range. The server 104 can obtain log data matching the query time range from the disk based on the boundary time value.

It may be understood that, the terminal 102 can obtain the query time range, and transmit the query time range to the server 104, so that the server 104 can determine the target node matching the query time range from the log query time tree. It may further be understood that, the server 104 can transmit the obtained log data matching the query time range to the terminal 102 for the terminal 102 to perform corresponding service processing. The above is not limited in this embodiment. It may be understood that, the application scenario in FIG. 1 is merely an exemplary description, and the present disclosure is not limited thereto.

Figure 2:
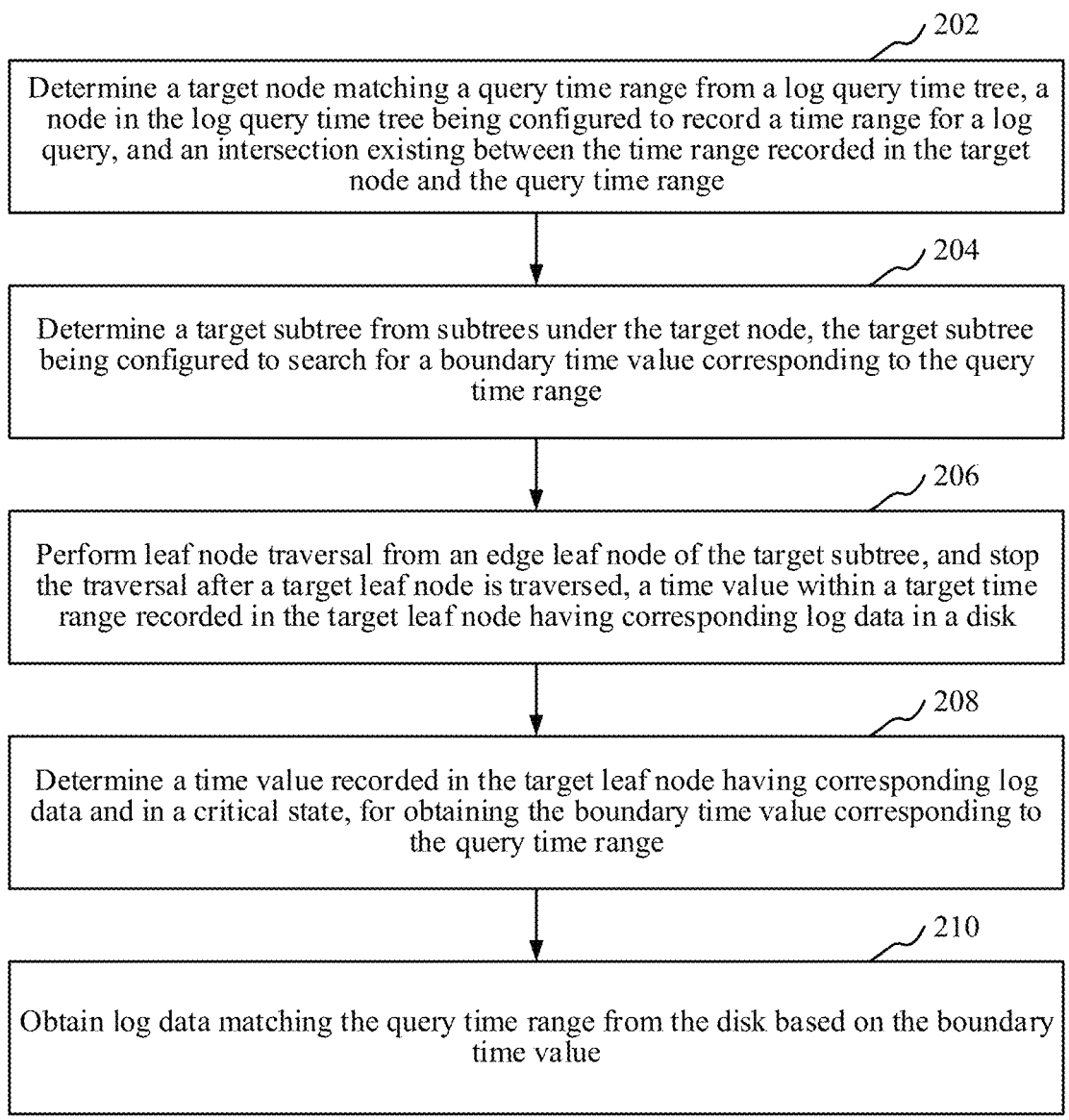
FIG. 2 is a schematic flowchart of a log data query method according to an embodiment of the present disclosure.

In an embodiment, as shown in FIG. 2, a log data query method is provided. The method may be applied to a computer device. The computer device may be a terminal or a server. The method may be performed by the terminal or the server independently, or may be performed through interaction between the terminal and the server. This embodiment is described by using an example in which the method is applied to the computer device. The method includes the following steps:

Step 202: Determine a target node matching a query time range from a log query time tree, each node in the log query time tree being configured to record a time range for a log query, and an intersection existing between the time range recorded in the target node and the query time range.

The query time range is a time range for log data query. For example, if a user wants to query for log data that falls within a time range 10:00-11:00 in yesterday, the time range 10:00-11:00 in yesterday is the query time range. The target node is a node in the log query time tree, between which and the query time range an intersection exists.

Specifically, each node in the log query time tree may have a time range for a log query recorded therein, and the log query time tree may be stored in a disk of the computer device. The computer device may determine a target node matching a query time range inputted by the user from the log query time tree located in the disk.

Step 204: Determine a target subtree from subtrees under the target node, the target subtree being configured to search for a boundary time value corresponding to the query time range.

The boundary time value is a time value of time values within the query time range having corresponding log data and in a critical state. For ease of understanding, an example is provided for description. For example, the query time range inputted by the user is 10:00-11:00. If there is no corresponding log data at each time point in two time ranges 10:00-10:09 and 10:51-11:00, the two time values of 10:10 and 10:50 has corresponding log data, and each time value within a time range of 10:10-10:50 may have corresponding log data, it may be understood that the two time values 10:10 and 10:50 are critical points in the time range 10:10-10:50. Therefore, the two time values 10:10 and 10:50 are boundary time values.

Specifically, at least one subtree exists under the target node. The computer device can determine the target subtree for searching for the boundary time value from the at least one subtree under the target node.

In an embodiment, the computer device can determine a status of intersection between the query time range inputted by the user and each subtree under the target node, and determine the target subtree for searching for the boundary time value corresponding to the query time range from the subtrees under the target node based on the status of intersection between the query time range and each subtree under the target node.

Step 206: Perform leaf node traversal from an edge leaf node of the target subtree, and stop the traversal after a target leaf node is traversed, a time value, within a target time range recorded in the target leaf node, having corresponding log data in a disk.

The leaf node is a leaf node of the nodes under the log query time tree without an out-degree. It may be understood that, the leaf node has no subsequent node, or the leaf node is an end node of a branch in the log query time tree. The edge leaf node is a leaf node of leaf nodes under the target subtree located on an edge. It may be understood that, the edge leaf node may include a left edge leaf node and a right edge leaf node. The left edge leaf node is a leftmost leaf node under the target subtree. The right edge leaf node is a rightmost leaf node under the target subtree. The target leaf node is a leaf node recording a time range in which a time value has corresponding log data in the disk. The target time range is a time range recorded in the target leaf node.

Specifically, the computer device can successively perform leaf node traversal from the edge leaf node of the target subtree toward neighboring leaf nodes, and stop the traversal after a target leaf node is traversed. It may be understood that, the computer device can successively perform leaf node traversal from the edge leaf node of the target subtree toward the neighboring leaf nodes. If a time value within a time range recorded in a leaf node currently being traversed has corresponding log data in the disk, the computer device can use the leaf node currently being traversed as the target leaf node, and can stop the leaf node traversal. In other words, leaf nodes subsequent to the target leaf node are not traversed.

In an embodiment, the computer device may determine attribute information of A boundary time value that currently needs to be searched for. In this case, the computer device can determine whether to perform the leaf node traversal from the left edge leaf node of the target subtree or from the right edge leaf node of the target subtree based on the attribute information of the boundary time value that currently needs to be searched for. The attribute information of the boundary time value is used for indicating whether the boundary time value that currently needs to be searched for is a lower boundary time value corresponding to the query time range or an upper boundary time value corresponding to the query time range. The lower boundary time value is a smaller one of two boundary time values corresponding to the query time range. The upper boundary time value is a larger one of the two boundary time values corresponding to the query time range.

It may be understood that, the time value 10:10 in the above example is the lower boundary time value corresponding to the query time range, and the time value 10:50 is the upper boundary time value corresponding to the query time range.

In an embodiment, the log query time tree may be specifically a multi-branch search tree configured to record the time range for a log query, such as a binary search tree and a ternary search tree, which is not limited in this embodiment.

Figure 3:
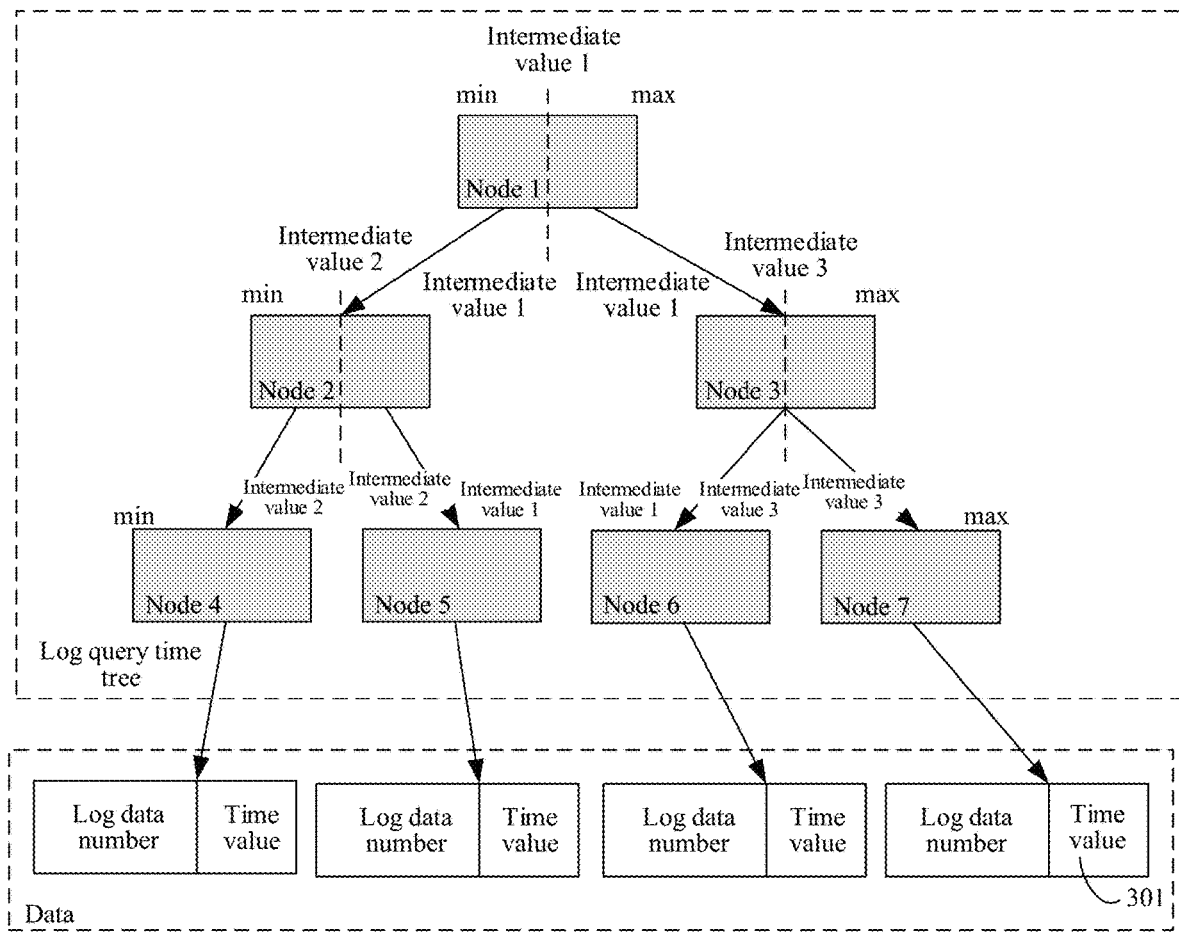
FIG. 3 is a schematic structural diagram of a log query time tree according to an embodiment of the present disclosure.

In an embodiment, the log query time tree is a binary search tree configured to record the time range for a log query. As shown in FIG. 3, the log query time tree includes 7 nodes (that is, a node 1 to a node 7). If the time range recorded in the log query time tree is [min, max], it may be understood that the node 1 is a root node of the log query time tree and a time range recorded in the node 1 is also [min, max]. min represents a minimum value of the time range recorded in the log query time tree, and max represents a maximum value of the time range recorded in the log query time tree. An intermediate value 1 is a time value within the time range [min, max] in a middle position. It may be understood that the time range of the node 1 may be divided into two parts based on the intermediate value 1, which respectively form a node 2 and a node 3. A time range recorded in the node 2 is [min, intermediate value 1], and a time range recorded in the node 3 is [intermediate value 1, max]. Similarly, an intermediate value 2 is a time value within the time range [min, intermediate value 1] in a middle position, and an intermediate value 3 is a time value within the time range [intermediate value 1, max] in a middle position. The time range of the node 2 may be divided into two parts based on the intermediate value 2, which respectively form a node 4 and a node 5. The time range of the node 3 may be divided into two parts based on the intermediate value 3, which respectively form a node 6 and a node 7. It may be understood that the node 4 to the node 7 have no subsequent nodes, and the node 4 to the node 7 are leaf nodes of the log query time tree.

Step 208: Determine a time value recorded in the target leaf node having corresponding log data and in a critical state, for obtaining the boundary time value corresponding to the query time range.

Specifically, the computer device can determine the time value recorded in the target leaf node having the corresponding log data and in the critical state, for obtaining the boundary time value corresponding to the query time range. It may be understood that, a plurality of time values within the query time range inputted by the user may all have corresponding log data. The computer device can determine a time value in the critical state from the plurality of time values having the corresponding log data, and use the determined time value as the boundary time value corresponding to the query time range.

In an embodiment, the target time range has two endpoint time values, namely, a range starting value and a range ending value of the target time range. The computer device can traverse each time value in the target time range in a direction from any of the endpoint time values in the target time range toward another endpoint time value, to search the target time range for the time value having the corresponding log data and in the critical state, for obtaining the boundary time value corresponding to the query time range. By successively traversing each time value in the target time range from one endpoint time value in the target time range toward another endpoint time value, missed search for a time value can be avoided, thereby improving log data query accuracy.

Step 210: Obtain log data matching the query time range from the disk based on the boundary time value.

In an embodiment, each boundary time value corresponding to the query time range is in a correspondence with a log data identifier of the log data stored in the disk. The computer device can obtain the log data matching the query time range from the disk based on the log data identifier corresponding to each boundary time value.

In the above log data query method, the target node matching the query time range is determined from the log query time tree, each node in the log query time tree being configured to record the time range for a log query, and an intersection existing between the time range recorded in the target node and the query time range. Since the log query time tree records the time range used for the log query, which has a small amount of data, during storage, the log query time tree occupies a smaller storage space than the log data, and occupies much fewer sectors than the log data. The target subtree for searching for the boundary time value corresponding to the query time range is determined from the subtrees under the target node, and the leaf node traversal is performed from the edge leaf node of the target subtree, and the traversal is stopped after the target leaf node is traversed, the time value within the target time range recorded in the target leaf node having the corresponding log data in the disk; The time value recorded in the target leaf node having the corresponding log data and in the critical state is determined, for obtaining the boundary time value corresponding to the query time range, and the log data matching the query time range is obtained from the disk based on the boundary time value. Since the log query time tree occupies much fewer sectors than the log data during storage, read and write operations on the sectors are reduced, a log data query time is reduced, and log data query efficiency is improved.

In addition, in the present disclosure, the leaf node traversal is performed from the edge leaf node of the target subtree, and the traversal is stopped after the target leaf node is traversed. In this way, the boundary time value corresponding to the query time range can be accurately found by searching without a need to traverse all of the leaf nodes, which reduces a boundary time value searching time and further improves log data query efficiency.

An existing log query manner may be implemented through binary search. If the log data is stored in a memory, the log data is not distributed into sectors in the memory for storage. In this case, log query in the memory through the binary search is efficient. However, due to a large amount of the log data, storing the log data in the memory requires high costs, and is at a high risk of data loss. Therefore, the log data is usually stored in the disk. Due to the large amount of the log data, the log data is stored in a plurality of sectors of the disk. If the disk is directly queried for log data within a certain time range through the binary search, scattered access is easily caused, and log data query efficiency is low.

Figure 4:
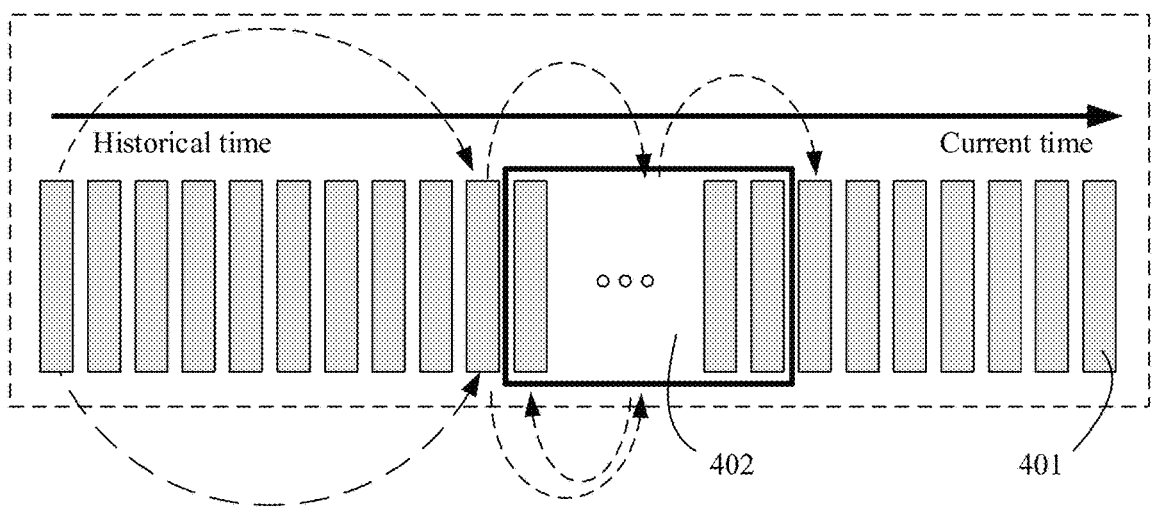
FIG. 4 is a schematic principle diagram of binary search according to an embodiment of the present disclosure.

For ease of understanding, an example is provided for description. As shown in FIG. 4, each gray rectangular block 401 represents a time value. It may be understood that the time values are ranked from left to right. 402 is a sector of the disk. If the disk is directly queried for log data within a time range through the binary search, read and write operations need to be performed on the plurality of sectors during the binary search. Each access to the sectors takes time, which results in low log data query efficiency. However, in the present disclosure, since the log query time tree is introduced to record the time range used for the log query, which has a small amount of data, during storage, the log query time tree occupies a smaller storage space than the log data, and occupies much fewer sectors than the log data. Read and write operations on the sectors are reduced, the log data query time is reduced, and the log data query efficiency is improved.

In an embodiment, at least two subtrees exist under the target node. The determining a target subtree from subtrees under the target node includes: using, when an intersection exists between the query time range and a time range recorded in one of the at least two subtrees under the target node, the subtree having the intersection as the target subtree.

Specifically, at least two subtrees exist under the target node. The computer device can determine a status of intersection between the query time range and a time range recorded in each subtree under the target node. When an intersection exists between the query time range and the time range recorded in one of the at least two subtrees under the target node, the subtree having the intersection is used as the target subtree for searching for the boundary time value corresponding to the query time range.

Figure 5:
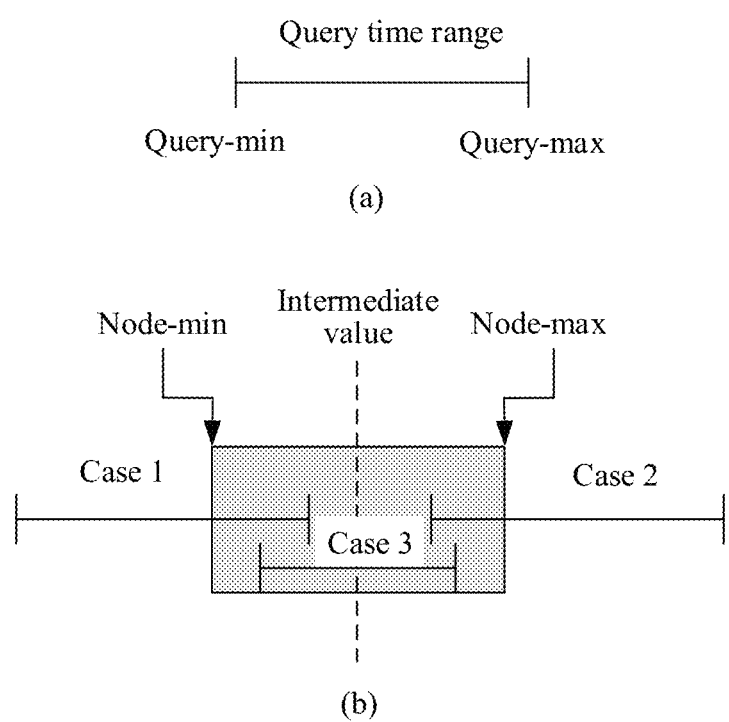
FIG. 5 is a schematic diagram of a status of intersection between a query time range and each subtree under a target node according to an embodiment of the present disclosure.

In an embodiment, the log query time tree is a binary search tree configured to record the time range for a log query. The subtrees under the target node include a left subtree and a right subtree. As shown in FIG. 5, a part (a) of FIG. 5 represents the query time range inputted by the user. The query time range is [query-min, query-max]. In a part (b) of FIG. 5, a gray rectangle represents a target node. A time range recorded in the target node is [node-min, node-max], and the intermediate value is a time value in the time range [node-min, node-max] in a middle position. The target node may be divided into the left subtree and the right subtree based on the intermediate value. A time range recorded in the left subtree is [node-min, intermediate value], and a time range recorded in the right subtree is [intermediate value, node-max]. If an intersection exists between the query time range and the time range recorded in the left subtree under the target node (that is, a case 1 in the part (b) of FIG. 5), the computer device can use the left subtree having the intersection as the target subtree for searching for the boundary time value corresponding to the query time range. If an intersection exists between the query time range and the time range recorded in the right subtree under the target node (that is, a case 2 in the part (b) of FIG. 5), the computer device can use the right subtree having the intersection as the target subtree for searching for the boundary time value corresponding to the query time range.

In the foregoing embodiments, when an intersection exists between the query time range and the time range recorded in one of the at least two subtrees under the target node, the boundary time value that needs to be searched for may exist only in the subtree having the intersection. Therefore, the subtree having the intersection may be directly used as the target subtree for searching for the boundary time value, which can improve query efficiency of the boundary time value.

In an embodiment, the log query time tree includes a binary log query time tree, the subtrees under the target node include a left subtree and a right subtree of the binary log query time tree, and the boundary time value includes a lower boundary time value. The determining a target subtree from subtrees under the target node includes: using the left subtree as the target subtree when the lower boundary time value needs to be searched for and that an intersection exists between the query time range and each of a time range recorded in the left subtree and a time range recorded in the right subtree. The performing leaf node traversal from an edge leaf node of the target subtree, and stopping the traversal after a target leaf node is traversed includes: performing leaf node traversal from a left edge leaf node of the left subtree, and stopping the traversal after the target leaf node is traversed.

Specifically, the binary log query time tree is a binary search tree configured to record the time range for a log query. The subtrees under the target node includes a left subtree and a right subtree. The boundary time value corresponding to the query time range includes a lower boundary time value and an upper boundary time value. The computer device can determine a status of intersection between the query time range and the time range recorded in each subtree under the target node. When an intersection exists between the query time range and each of the time range recorded in the left subtree and the time range recorded in the right subtree (that is, a case 3 in the section (b) of FIG. 5), if the lower boundary time value needs to be searched for, the computer device can use the left subtree (that is, the subtree with the time range [node-min, intermediate value] recorded in FIG. 5) as the target subtree, and perform the leaf node traversal from the left edge leaf node of the left subtree, and stop the traversal after the target leaf node is traversed.

In the foregoing embodiments, when an intersection exists between the query time range and each of the time range recorded in the left subtree and the time range recorded in the right subtree, it indicates that the boundary time value that needs to be searched for may exist in either the left subtree or the right subtree. For each layer in the log query time tree, time values recorded in nodes in the layer successively increase from left to right. Therefore, a probability that the lower boundary time value exists in the left subtree is greater than a probability that the lower boundary time value exists in the right subtree. If the lower boundary time value needs to be searched for, the left subtree may be directly used as the target subtree, and the left subtree is preferentially searched for the lower boundary time value, which can improve query efficiency of the lower boundary time value.

In an embodiment, the method further includes: performing leaf node traversal from a left edge leaf node of the right subtree and stopping the traversal after the target leaf node is traversed when traversal is not performed from the left subtree to the target leaf node.

Specifically, when traversal is not performed from the left subtree (that is, the subtree with the time range [node-min, intermediate value] recorded in FIG. 5) to the target leaf node, the computer device can perform the leaf node traversal from the left edge leaf node of the right subtree (that is, the subtree with the time range [intermediate value, node-max] recorded in FIG. 5), and stop the traversal after the target leaf node is traversed.

In the foregoing embodiments, when traversal is not performed from the left subtree to the target leaf node, it indicates that the boundary time value that needs to be searched for exists in the right subtree. For each layer in the log query time tree, the time values recorded in the nodes in the layer successively increase from left to right. Therefore, directly performing the leaf node traversal from the left edge leaf node of the right subtree can improve the query efficiency of the boundary time value.

In an embodiment, the subtrees under the target node include a left subtree and a right subtree, and the boundary time value includes an upper boundary time value. The determining a target subtree from subtrees under the target node includes: using the right subtree as the target subtree when the upper boundary time value needs to be searched for and that an intersection exists between the query time range and each of a time range recorded in the left subtree and a time range recorded in the right subtree. The performing leaf node traversal from an edge leaf node of the target subtree, and stopping the traversal after a target leaf node is traversed includes: performing leaf node traversal from a right edge leaf node of the right subtree, and stopping the traversal after the target leaf node is traversed.

Specifically, the log query time tree is a binary search tree configured to record the time range for a log query. The subtrees under the target node includes a left subtree and a right subtree. The boundary time value corresponding to the query time range includes a lower boundary time value and an upper boundary time value. The computer device can determine a status of intersection between the query time range and a time range recorded in each subtree under the target node. When an intersection exists between the query time range and each of the time range recorded in the left subtree and the time range recorded in the right subtree (that is, a case 3 in the section (b) of FIG. 5), if the upper boundary time value needs to be searched for, the computer device can use the right subtree (that is, the subtree with the time range [intermediate value, node-max] recorded in FIG. 5) as the target subtree, and perform the leaf node traversal from the right edge leaf node of the right subtree, and stop the traversal after the target leaf node is traversed.

In the foregoing embodiments, when an intersection exists between the query time range and each of the time range recorded in the left subtree and the time range recorded in the right subtree, it indicates that the boundary time value that needs to be searched for may exist in either the left subtree or the right subtree. For each layer in the log query time tree, time values recorded in nodes in the layer successively increase from left to right. Therefore, a probability that the upper boundary time value exists in the right subtree is greater than a probability that the upper boundary time value exists in the left subtree. If the upper boundary time value needs to be searched for, the right subtree is preferentially searched for the upper boundary time value, and the right subtree may be directly used as the target subtree, which can improve query efficiency of an upper boundary time value.

In an embodiment, the method further includes: performing leaf node traversal from a right edge leaf node of the left subtree and stopping the traversal after the target leaf node is traversed when traversal is not performed from the right subtree to the target leaf node.

Specifically, when the traversal is not performed from the right subtree (that is, the subtree with the time range [intermediate value, node-max] recorded in FIG. 5) to the target leaf node, the computer device can perform the leaf node traversal from the right edge leaf node of the left subtree (that is, the subtree with the time range [node-min, intermediate value] recorded in FIG. 5), and stops the traversal after to the target leaf node is traversed.

In the foregoing embodiments, when traversal is not performed from the right subtree to the target leaf node, it indicates that the boundary time value that needs to be searched for exists in the left subtree. For each layer in the log query time tree, the time values recorded in the nodes in the layer successively increase from left to right. Therefore, directly performing the leaf node traversal from the right edge leaf node of the left subtree can improve the query efficiency of the boundary time value.

Figure 6:
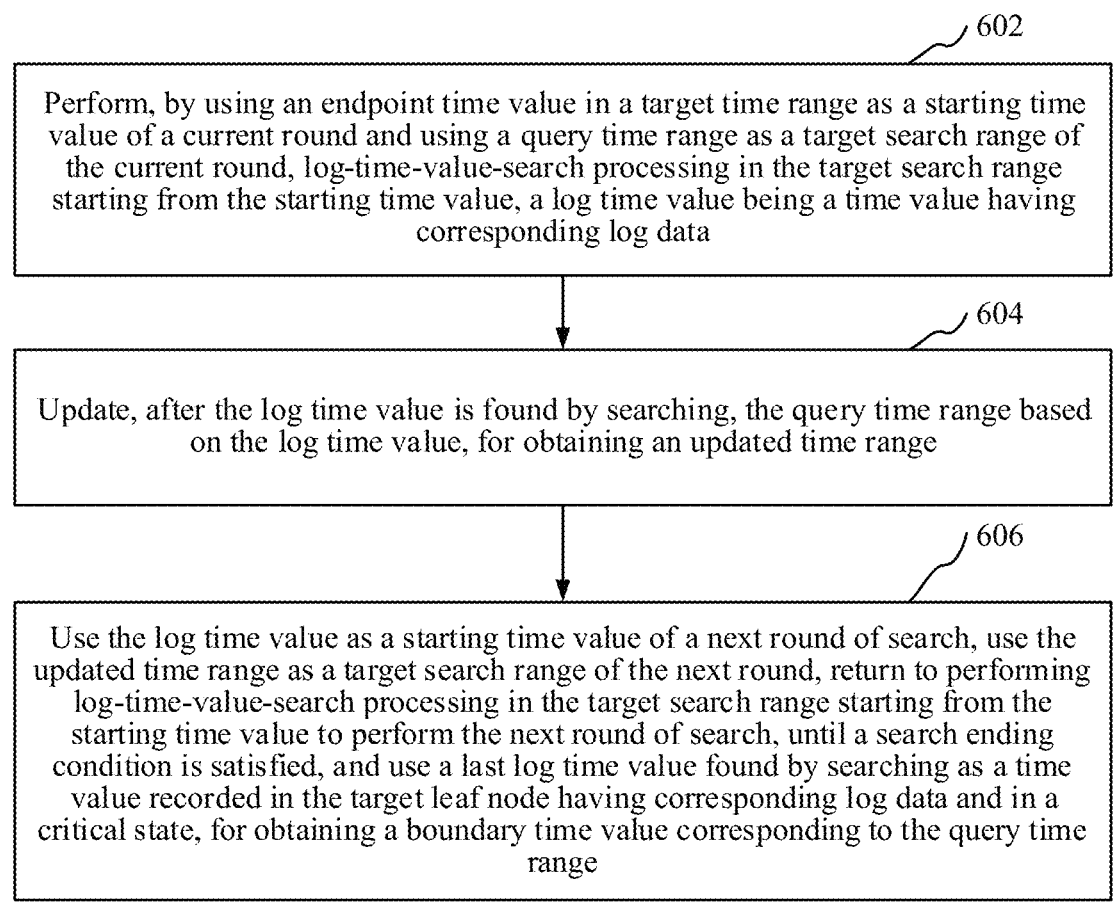
FIG. 6 is a schematic flowchart of steps of querying for a boundary time value according to an embodiment of the present disclosure.

In an embodiment, as shown in FIG. 6, the traversing each time value in the target time range in a direction from any of the endpoint time values in the target time range recorded in the target leaf node toward another endpoint time value in the target time range, to search the target time range for the time value having the corresponding log data and in the critical state, for obtaining the boundary time value corresponding to the query time range includes:

Step 602: Perform, by using the endpoint time value in the target time range as a starting time value of a current round and using the query time range as a target search range of the current round, log-time-value-search processing in the target search range starting from the starting time value. A log time value is a time value having corresponding log data.

The endpoint time value is a time value corresponding to the endpoint in the target time range. The starting time value of the current round is a first time value searched for in the current round of log-time-value-search processing. The target search range of the current round is a time range for the current round of log-time-value-search processing. It may be understood that, the starting time value and the target search range are constantly updated.

Specifically, the target time range includes two endpoint time values. The computer device can use either of the two endpoint time values as the starting time value of the current round, and use the query time range inputted by the user as the target search range of the current round. Further, the computer device can perform log-time-value-search processing in the target search range starting from the starting time value.

Step 604: Update, after the log time value is found by searching, the query time range based on the log time value, to obtain an updated time range.

Specifically, after finding the log time value by searching the target search range, the computer device can update the query time range inputted by the user based on the log time value found by searching, to obtain the updated time range.

Step 606: Use the log time value as a starting time value of a next round of search, use the updated time range as a target search range of the next round, return to performing log-time-value-search processing in the target search range starting from the starting time value to perform the next round of search, until a search ending condition is satisfied, and use a last log time value found by searching as the time value recorded in the target leaf node having the corresponding log data and in the critical state, for obtaining the boundary time value corresponding to the query time range.

The search ending condition is a condition causing the iterative process of log-time-value-search processing to stop.

In an embodiment, the search ending condition includes that each time value in the target time range is traversed or that a quantity of times for performing the log-time-value-search processing reaches at least one of preset search quantities. In this way, more diverse iteration stop conditions can be realized for log-time-value-search processing, thereby improving efficiency of log-time-value-search processing.

Specifically, the computer device can use the log time value found by searching in the current round as the starting time value of the next round of search, use the updated time range in the current round as the target search range of the next round, use the next round as the current round, and return to performing log-time-value-search processing in the target search range starting from the starting time value to perform the next round of search, until a search ending condition is satisfied. The computer device can use the last log time value found by searching as the time value recorded in the target leaf node having the corresponding log data and in the critical state, for obtaining the boundary time value corresponding to the query time range.

In the foregoing embodiments, log-time-value-search processing is iteratively performed in the target search range, and the query time range is updated based on the log time value each time the log time value is found by searching, to narrow the search range step by step, so that the time value recorded in the target leaf node having the corresponding log data and in the critical state can be quickly found, which can improve searching efficiency of the boundary time value and further improve the log data query efficiency.

In an embodiment, the endpoint time value is a time value corresponding to an offset of a log data storage file in a disk to which the target leaf node points. The performing, by using the endpoint time value in the target time range as a starting time value of a current round and using the query time range as a target search range of the current round, log-time-value-search processing in the target search range starting from the starting time value includes: updating, by using the time value corresponding to the offset as the starting time value of the current round and using the query time range as the target search range of the current round, the offset of the data storage file in the disk to which the target leaf node points starting from the starting time value, to perform log-time-value-search processing in the target search range.

The log data storage file is a file for storing log data.

Specifically, the endpoint time value is a time value corresponding to an offset of a log data storage file in a disk to which the target leaf node points. The computer device can update, by using the time value corresponding to the offset as the starting time value of the current round and using the query time range as the target search range of the current round, the offset of the data storage file in the disk to which the target leaf node points starting from the starting time value, to read the log data from a corresponding position of the log data storage file in the disk, thereby performing log-time-value-search processing in the target search range. thereby implementing the log time value search process in the target search range.

In an embodiment, referring to FIG. 3, it is assumed that the node 7 is a target leaf node found by searching. Since a time range recorded in the node 7 is [intermediate value 3, max], if the endpoint time value is the "intermediate value 3", the "intermediate value 3" recorded in the log data storage file (that is, the time value corresponding to 301 in FIG. 3) is the time value corresponding to the offset of the log data storage file in the disk to which the node 7 points. The computer device can update the offset of the data storage file in the disk to which the target leaf node points starting from the time value corresponding to 301 in FIG. 3, to read the log data from the corresponding position of the log data storage file in the disk, thereby performing log-time-value-search processing in the target search range. It may be understood that, if the time value found by searching has a corresponding log data number in the log data storage file, it indicates that the time value found by searching has corresponding log data in the log data storage file. The time value found by searching is the log time value found by searching. The log data number is used for uniquely identifying the log data. It may be understood that the log data number is an expression of the log data identifier.

In the foregoing embodiments, the offset of the data storage file in the disk to which the target leaf node points is continuously updated by using the time value corresponding to the offset as the starting time value of the current round starting from the starting time value, thereby quickly reading the corresponding data from the disk to perform the log-time-value-search processing in the target search range, which can improve the searching efficiency of the boundary time value, thereby further improving the log data query efficiency.

In an embodiment, the updating, after the log time value is found by searching, query time range based on the log time value, to obtain an updated time range includes: updating an upper limit value of the query time range by using the log time value to obtain the updated time range during searching for a lower boundary time value corresponding to the query time range.

The upper limit value of the query time range is a largest time value of the various time values within the query time range.

Specifically, the boundary time value corresponding to the query time range includes the upper boundary time value and the lower boundary time value. The computer device can update the upper limit value of the query time range by using the log time value to obtain the updated time range during searching for the lower boundary time value corresponding to the query time range.

For example, if the query time range is [min, max], and the log time value found by searching [min, max] is V1, the computer device can update the upper limit value max of the query time range [min, max] by using the log time value V1 to obtain an updated time range [min, V1].

In the foregoing embodiments, during searching for the lower boundary time value corresponding to the query time range, a last lower boundary time value found by searching is a log time value closest to the lower limit value in the query time range. Therefore, the log time value is used for updating the upper limit value of the query time range to obtain the updated time range, which can improve the query efficiency of the lower boundary time value.

In an embodiment, the updating, after the log time value is found by searching, query time range based on the log time value, to obtain an updated time range includes: updating a lower limit value of the query time range by using the log time value to obtain the updated time range during searching for an upper boundary time value corresponding to the query time range.

The lower limit value of the query time range is a smallest time value of the various time values within the query time range.

Specifically, the boundary time value corresponding to the query time range includes the upper boundary time value and the lower boundary time value. The computer device can update the lower limit value of the query time range by using the log time value to obtain the updated time range during searching for the upper boundary time value corresponding to the query time range.

For example, if the query time range is [min, max], and the log time value found by searching [min, max] is V2, the computer device can update the lower limit value min of the query time range [min, max] by using the log time value V2 to obtain an updated time range [V2, max].

In the foregoing embodiments, during searching for the upper boundary time value corresponding to the query time range, a last upper boundary time value found by searching is a log time value closest to the upper limit value in the query time range. Therefore, the log time value is used for updating the lower limit value of the query time range to obtain the updated time range, which can improve the query efficiency of the upper boundary time value.

In an embodiment, the boundary time value includes the lower boundary time value and the upper boundary time value. The obtaining log data matching the query time range from the disk based on the boundary time value includes: obtaining log data corresponding to each log data number within a target number range from the disk as the log data matching the query time range, the target number range being a number range formed by using a log data number corresponding to the lower boundary time value as a starting value of the range and using a log data number corresponding to the upper boundary time value as an ending value of the range.

Specifically, the boundary time value includes the lower boundary time value and the upper boundary time value. The computer device can obtain the log data number corresponding to the lower boundary time value, and obtain the log data number corresponding to the upper boundary time value. The computer device may use the log data number corresponding to the lower boundary time value as the starting value of the range, and use the log data number corresponding to the upper boundary time value as the ending value of the range to construct the target number range. The computer device may can the log data corresponding to each log data number within the target number range from the disk as the log data matching the query time range.

In the foregoing embodiments, the log data number corresponding to the lower boundary time value is used as the starting value of the target number range, and the log data number corresponding to the upper boundary time value is used as the ending value of the target number range. Therefore, each log data number included in the target number range is in a correspondence with each log time value in the query time range. In this way, the log data corresponding to each log data number in the target number range may be obtained from the disk to be directly used as the log data matching the query time range, which further improves the log data query efficiency.

Figure 7:
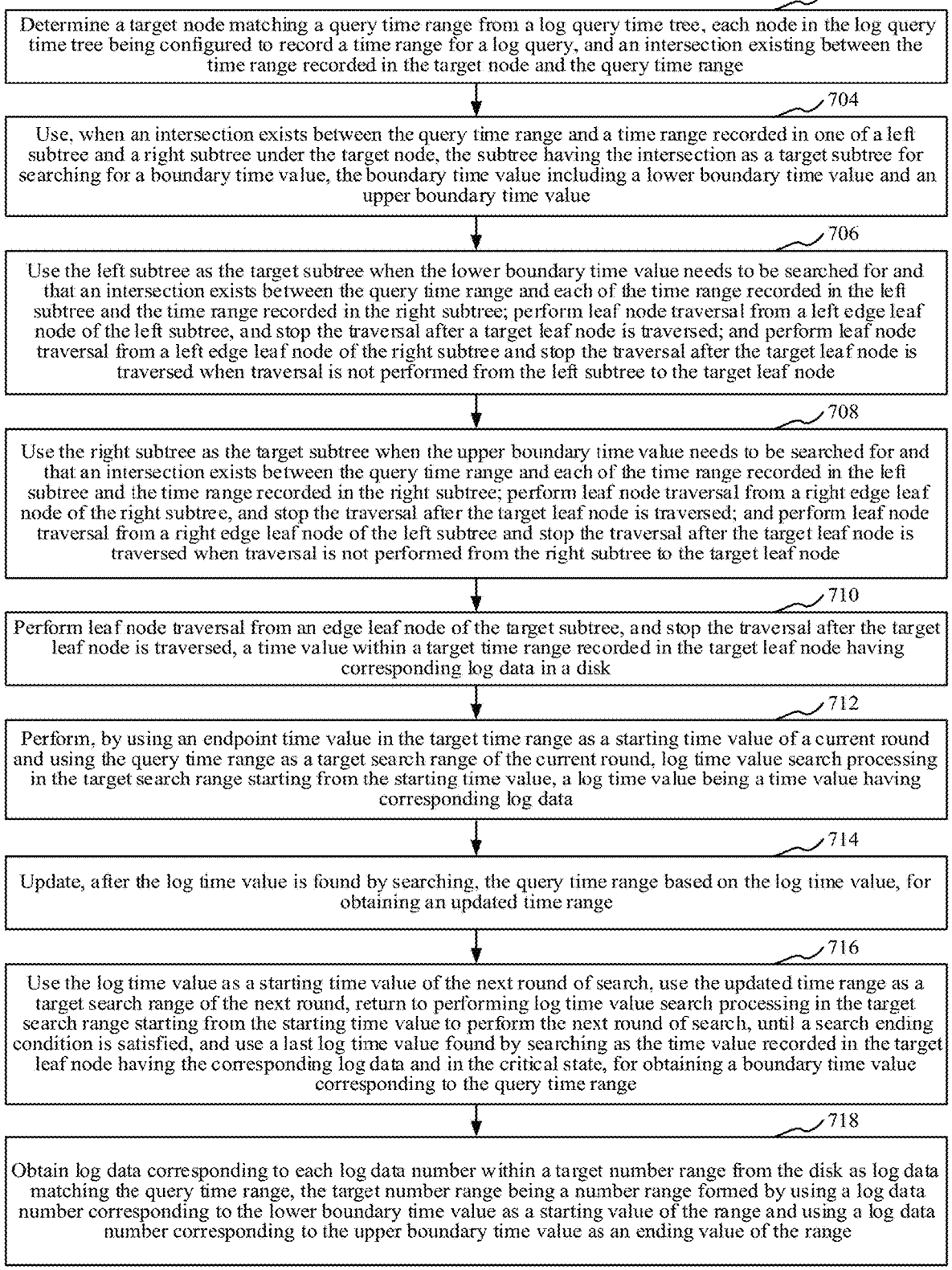
FIG. 7 is a schematic flowchart of a log data query method according to another embodiment of the present disclosure.

As shown in FIG. 7, in an embodiment, a log data query method is provided. The method may be applied to a computer device. The computer device may be a terminal or a server. The method may be performed by the terminal or the server independently, or may be performed through interaction between the terminal and the server. This embodiment is described by using an example in which the method is applied to the computer device. The method specifically includes the following steps:

Step 702: Determine a target node matching a query time range from a log query time tree, each node in the log query time tree being configured to record a time range for a log query, and an intersection existing between the time range recorded in the target node and the query time range.

Step 704: Use, when an intersection exists between the query time range and a time range recorded in one of a left subtree and a right subtree under the target node, the subtree having the intersection as a target subtree for searching for a boundary time value, the boundary time value including a lower boundary time value and an upper boundary time value.

Step 706: Use the left subtree as the target subtree when the lower boundary time value needs to be searched for and that an intersection exists between the query time range and each of the time range recorded in the left subtree and the time range recorded in the right subtree; perform leaf node traversal from a left edge leaf node of the left subtree, and stop the traversal after the target leaf node is traversed; and perform leaf node traversal from a left edge leaf node of the right subtree and stop the traversal after the target leaf node is traversed when traversal is not performed from the left subtree to the target leaf node.

Step 708: Use the right subtree as the target subtree when the upper boundary time value needs to be searched for and that an intersection exists between the query time range and each of the time range recorded in the left subtree and the time range recorded in the right subtree; perform leaf node traversal from a right edge leaf node of the right subtree, and stop the traversal after the target leaf node is traversed; and perform leaf node traversal from a right edge leaf node of the left subtree and stop the traversal after the target leaf node is traversed when traversal is not performed from the right subtree to the target leaf node.

Step 710: Perform leaf node traversal from an edge leaf node of the target subtree, and stop the traversal after a target leaf node is traversed, a time value, within a target time range recorded in the target leaf node, having corresponding log data in a disk.

Step 712: Perform, by using the endpoint time value in the target time range as a starting time value of a current round and using the query time range as a target search range of the current round, log-time-value-search processing in the target search range starting from the starting time value. A log time value is a time value having corresponding log data.

Step 714: Update, after the log time value is found by searching, the query time range based on the log time value, to obtain an updated time range.

Step 716: Use the log time value as a starting time value of a next round of search, use the updated time range as a target search range of the next round, returning to performing log-time-value-search processing in the target search range starting from the starting time value to perform the next round of search, until a search ending condition is satisfied, and use a last log time value found by searching as the time value recorded in the target leaf node having the corresponding log data and in the critical state, for obtaining the boundary time value corresponding to the query time range.

Step 718: Obtain log data corresponding to each log data number within a target number range from the disk as the log data matching the query time range, the target number range being a number range formed by using a log data number corresponding to the lower boundary time value as a starting value of the range and using a log data number corresponding to the upper boundary time value as an ending value of the range.

The present disclosure further provides an application scenario. The foregoing log data query method is applied to the application scenario. Specifically, the log data query method may be applied to a scenario of implementing the log data query based on a binary search tree. It may be understood that the log query time tree is a binary log query time tree. The computer device can determine the target node matching the query time range from the binary log query time tree, each node in the binary log query time tree being configured to record the time range for a log query, and an intersection existing between the time range recorded in the target node and the query time range. When an intersection exists between the query time range and the time range recorded in the left subtree and the right subtree under the target node, the subtree having the intersection is used as the target subtree for searching for the boundary time value. The boundary time value includes the lower boundary time value and the upper boundary time value.

The computer device can use the left subtree as the target subtree when the lower boundary time value needs to be searched for and that an intersection exists between the query time range and each of the time range recorded in the left subtree and the time range recorded in the right subtree; perform leaf node traversal from the left edge leaf node of the left subtree, and stop the traversal after the target leaf node is traversed; perform leaf node traversal from the left edge leaf node of the right subtree and stop the traversal after the target leaf node is traversed when traversal is not performed from the left subtree to the target leaf node. The computer device can use the right subtree as the target subtree when the upper boundary time value needs to be searched for and that an intersection exists between the query time range and each of the time range recorded in the left subtree and the time range recorded in the right subtree; perform leaf node traversal from the right edge leaf node of the right subtree, and stop the traversal after the target leaf node is traversed; perform leaf node traversal from the right edge leaf node of the left subtree and stop the traversal after the target leaf node is traversed when traversal is not performed from the right subtree to the target leaf node.

The computer device can perform leaf node traversal from the edge leaf node of the target subtree, and stop the traversal after the target leaf node is traversed, the time value within the target time range recorded in the target leaf node having the corresponding log data in the disk; perform, by using the endpoint time value in the target time range as the starting time value of the current round and using the query time range as current round target search range of the current round, log-time-value-search processing in the target search range starting from the starting time value, the log time value being the time value having the corresponding log data; update, after the log time value is found by searching, the query time range based on the log time value, to obtain the updated time range; and Use the log time value as the starting time value of the next round of search, use the updated time range as the target search range of the next round, return to performing log-time-value-search processing in the target search range starting from the starting time value to perform the next round of search, until the search ending condition is satisfied, and use the last log time value found by searching as the time value recorded in the target leaf node having the corresponding log data and in the critical state, thereby obtaining the boundary time value corresponding to the query time range.

The computer device can obtain the log data corresponding to each log data number within the target number range from the disk as the log data matching the query time range, the target number range being the number range formed by using the log data number corresponding to the lower boundary time value as the starting value of the range and using the log data number corresponding to the upper boundary time value as the ending value of the range.

The present disclosure further provides an application scenario. The foregoing log data query method is applied to the application scenario. Specifically, the log data query method may be applied to a scenario of implementing the log data query based on a multi-branch search tree. It may be understood that, the log query time tree may be a multi-branch log query time tree, such as a ternary log query time tree or a log query time quadtree. It may be understood that, each node in the multi-branch log query time tree is configured to record a time range for a log query. Based on the multi-branch log query time, quick query for the log data in the disk can be realized, which improves the log data query efficiency.

It is to be understood that, although the steps are displayed sequentially in the flowcharts of the embodiments, these steps are not necessarily performed sequentially according to the sequence. Unless otherwise explicitly specified in this specification, execution of the steps is not strictly limited, and the steps may be performed in another sequence. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 8:
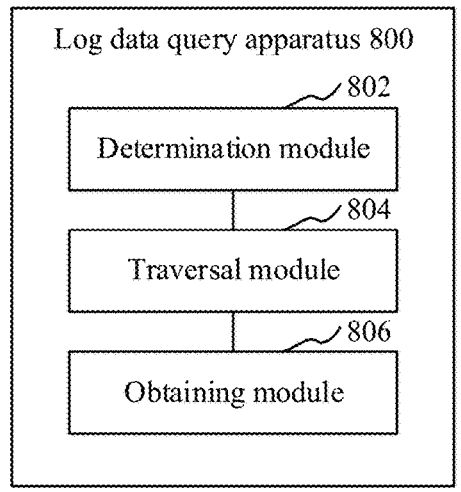
FIG. 8 is a structural block diagram of a log data query apparatus according to an embodiment of the present disclosure.

In an embodiment, as shown in FIG. 8, a log data query apparatus 800 is provided. The apparatus may be a software module, a hardware module, or a combination thereof to be incorporated as a part of a computer device. The apparatus specifically includes:

a determination module 802, configured to determine a target node matching a query time range from a log query time tree, each node in the log query time tree being configured to record a time range for a log query, and an intersection existing between the time range recorded in the target node and the query time range;

the determination module 802 being further configured to determine a target subtree from subtrees under the target node; the target subtree being configured to search for a boundary time value corresponding to the query time range;

a traversal module 804, configured to perform leaf node traversal from an edge leaf node of the target subtree, and stopping the traversal after a target leaf node is traversed, a time value, within a target time range recorded in the target leaf node, having corresponding log data in a disk;

the determination module 802 being further configured to determine a time value recorded in the target leaf node having corresponding log data and in a critical state, to obtain the boundary time value corresponding to the query time range; and an obtaining module 806, configured to obtain log data matching the query time range from the disk based on the boundary time value.

In an embodiment, at least two subtrees exist under the target node. The determination module 802 is further configured to use, when an intersection exists between the query time range and a time range recorded in one of the at least two subtrees under the target node, the subtree having the intersection as the target subtree.

In an embodiment, the subtrees under the target node include a left subtree and a right subtree, and the boundary time value includes a lower boundary time value. The determination module 802 is further configured to use the left subtree as the target subtree when the lower boundary time value needs to be searched for and that an intersection exists between the query time range and each of a time range recorded in the left subtree and a time range recorded in the right subtree. The traversal module 804 is further configured to perform leaf node traversal from a left edge leaf node of the left subtree, and stop the traversal after the target leaf node is traversed.

In an embodiment, the traversal module 804 is further configured to perform leaf node traversal from a left edge leaf node of the right subtree and stop the traversal after the target leaf node is traversed when traversal is not performed from the left subtree to the target leaf node.

In an embodiment, the subtrees under the target node include a left subtree and a right subtree, and the boundary time value includes an upper boundary time value. The determination module 802 is further configured to use the right subtree as the target subtree when the upper boundary time value needs to be searched for and that an intersection exists between the query time range and each of a time range recorded in the left subtree and a time range recorded in the right subtree. The traversal module 804 is further configured to perform leaf node traversal from a right edge leaf node of the right subtree, and stop the traversal after the target leaf node is traversed.

In an embodiment, the traversal module 804 is further configured to perform leaf node traversal from a right edge leaf node of the left subtree and stop the traversal after the target leaf node is traversed when traversal is not performed from the right subtree to the target leaf node.

In an embodiment, the target time range recorded in the target leaf node has two endpoint time values. The determination module 802 is further configured to traverse each time value in the target time range in a direction from any of the endpoint time values in the target time range recorded in the target leaf node toward another endpoint time value in the target time range, to search the target time range for the time value having the corresponding log data and in the critical state, thereby obtaining the boundary time value corresponding to the query time range.

In an embodiment, the determination module 802 is further configured to: perform, by using the endpoint time value in the target time range recorded in the target leaf node as a starting time value of a current round and using the query time range as a target search range of the current round, log-time-value-search processing in the target search range starting from the starting time value a log time value being a time value having corresponding log data; update, after the log time value is found by searching, the query time range based on the log time value, to obtain an updated time range; and use the log time value as a starting time value of a next round of search, use the updated time range as a target search range of the next round, return to performing log-time-value-search processing in the target search range starting from the starting time value to perform the next round of search, until a search ending condition is satisfied, and use a last log time value found by searching as the time value recorded in the target leaf node having the corresponding log data and in the critical state, thereby obtaining the boundary time value corresponding to the query time range.

In an embodiment, the endpoint time value is a time value corresponding to an offset of a log data storage file in a disk to which the target leaf node points. The determination module 802 is further configured to update, by using the time value corresponding to the offset as the starting time value of the current round and using the query time range as the target search range of the current round, the offset of the data storage file in the disk to which the target leaf node points starting from the starting time value, to perform log-time-value-search processing in the target search range.

In an embodiment, the determination module 802 is further configured to update an upper limit value of the query time range by using the log time value to obtain the updated time range during searching for a lower boundary time value corresponding to the query time range.

In an embodiment, the determination module 802 is further configured to update a lower limit value of the query time range by using the log time value to obtain the updated time range during searching for an upper boundary time value corresponding to the query time range.

In an embodiment, the search ending condition includes that each time value in the target time range is traversed or that a quantity of times for performing the log-time-value-search processing reaches at least one of preset search quantities.

In an embodiment, the boundary time value includes the lower boundary time value and the upper boundary time value. The obtaining module 806 is configured to obtain log data corresponding to each log data number within a target number range from the disk as the log data matching the query time range, the target number range being a number range formed by using a log data number corresponding to the lower boundary time value as a starting value of the range and using a log data number corresponding to the upper boundary time value as an ending value of the range.

In the foregoing log data query apparatus, the target node matching the query time range is determined from the log query time tree, each node in the log query time tree being configured to record the time range for a log query, and an intersection existing between the time range recorded in the target node and the query time range. Since the log query time tree records the time range used for the log query, which has a small amount of data, during storage, the log query time tree occupies a smaller storage space than the log data, and occupies much fewer sectors than the log data. The target subtree for searching the for boundary time value is determined from the subtrees under the target node, and the leaf node traversal is performed from the edge leaf node of the target subtree, and the traversal is stopped after the target leaf node is traversed, the time value within the target time range recorded in the target leaf node having the corresponding log data in the disk; The time value recorded in the target leaf node having the corresponding log data and in the critical state is determined, to obtain the boundary time value corresponding to the query time range, and the log data matching the query time range is obtained from the disk based on the boundary time value. Since the log query time tree occupies much fewer sectors than the log data during storage, read and write operations on the sectors are reduced, a log data query time is reduced, and log data query efficiency is improved.

All or some of the modules in the foregoing log data query apparatus may be implemented by a software, a hardware, or a combination thereof. The foregoing modules may be built in or independent of a processor of a computer device in a form of hardware, or may be stored in a memory of the computer device in a form of software, so that the processor invokes each of the foregoing modules to perform an operation corresponding to the module.

In an embodiment, a computer device is provided. The computer device may be a server. An internal structure diagram of the server may be shown in FIG. 9. The computer device includes one or more processors, a memory, an input/output (I/O for short) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for execution of the operating system and the computer-readable instructions in the non-volatile storage medium. The I/O interface of the computer device is configured to exchange information between the processor and the external device. The communication interface of the computer device is configured to connect to and communicate with an external terminal through a network. The computer-readable instructions, when executed by the processor, implement the log data query method.

In an embodiment, a computer device is provided. The computer device may be a terminal. An internal structure diagram of the computer device may be shown in FIG. 10. The computer device includes one or more processors, a memory, a I/O interface, a communication interface, a display unit, and an input apparatus. The processor, the memory, and the I/O interface are connected through a system bus. The communication interface, the display unit, and the input apparatus are connected to the system bus through the I/O interface. The processor of the computer device is configured to provide computing and control capabilities. The memory of the computer device includes a non-volatile storage medium and an internal memory. The non-volatile storage medium has an operating system and computer-readable instructions stored therein. The internal memory provides an environment for execution of the operating system and the computer-readable instructions in the non-volatile storage medium. The I/O interface of the computer device is configured to exchange information between the processor and the external device. The communication interface of the computer device is configured for wired or wireless communication with an external terminal. The wireless communication may be implemented through Wi-Fi, a mobile cellular network, near field communication (NFC), or another technology. The computer-readable instructions, when executed by the processor, implement the log data query method. The display unit of the computer device is configured to form a visually visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a button, a trackball, or a touchpad arranged on a housing of the computer device, or may be an external keyboard, touchpad, a mouse, or the like.

Figure 9:
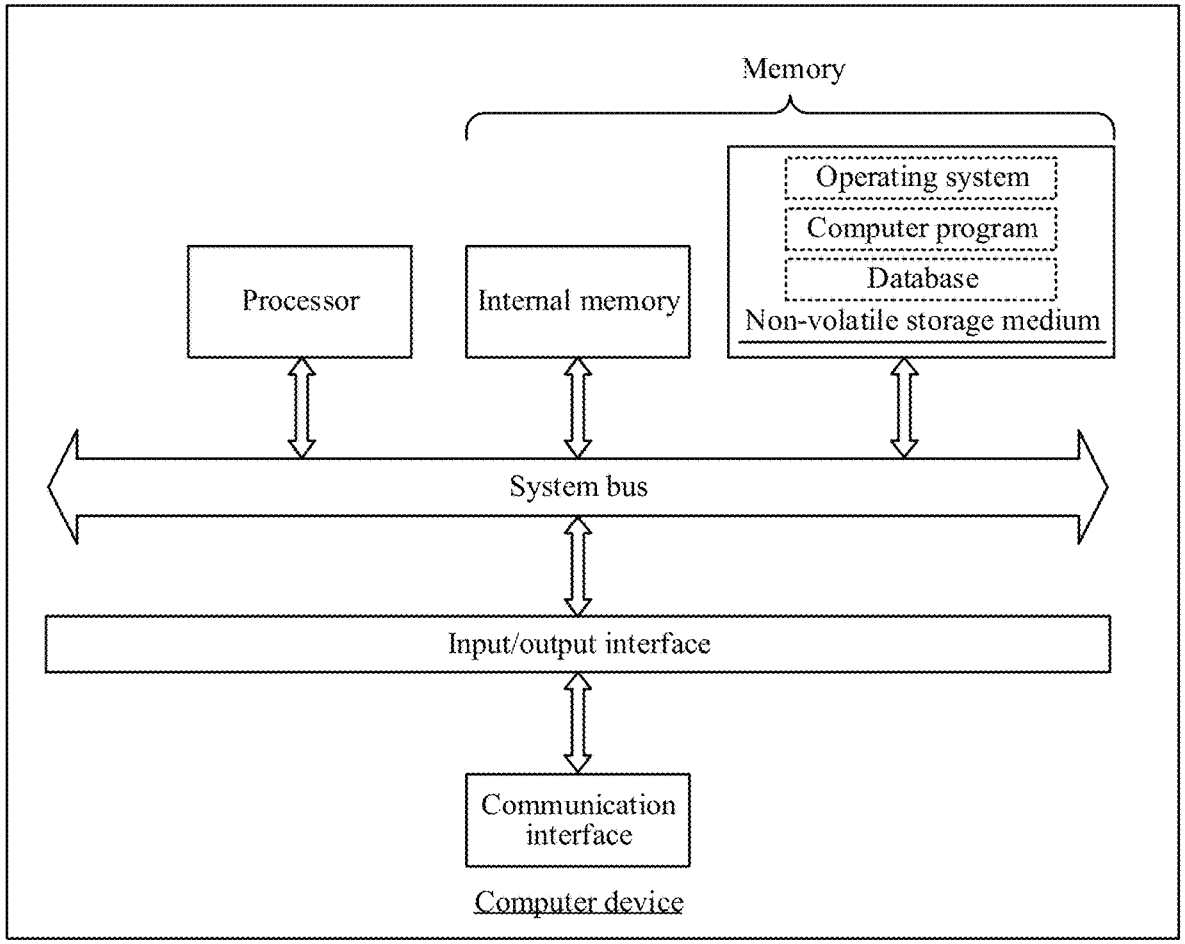
FIG. 9 is a diagram of an internal structure of a computer device according to an embodiment of the present disclosure.
Figure 10:
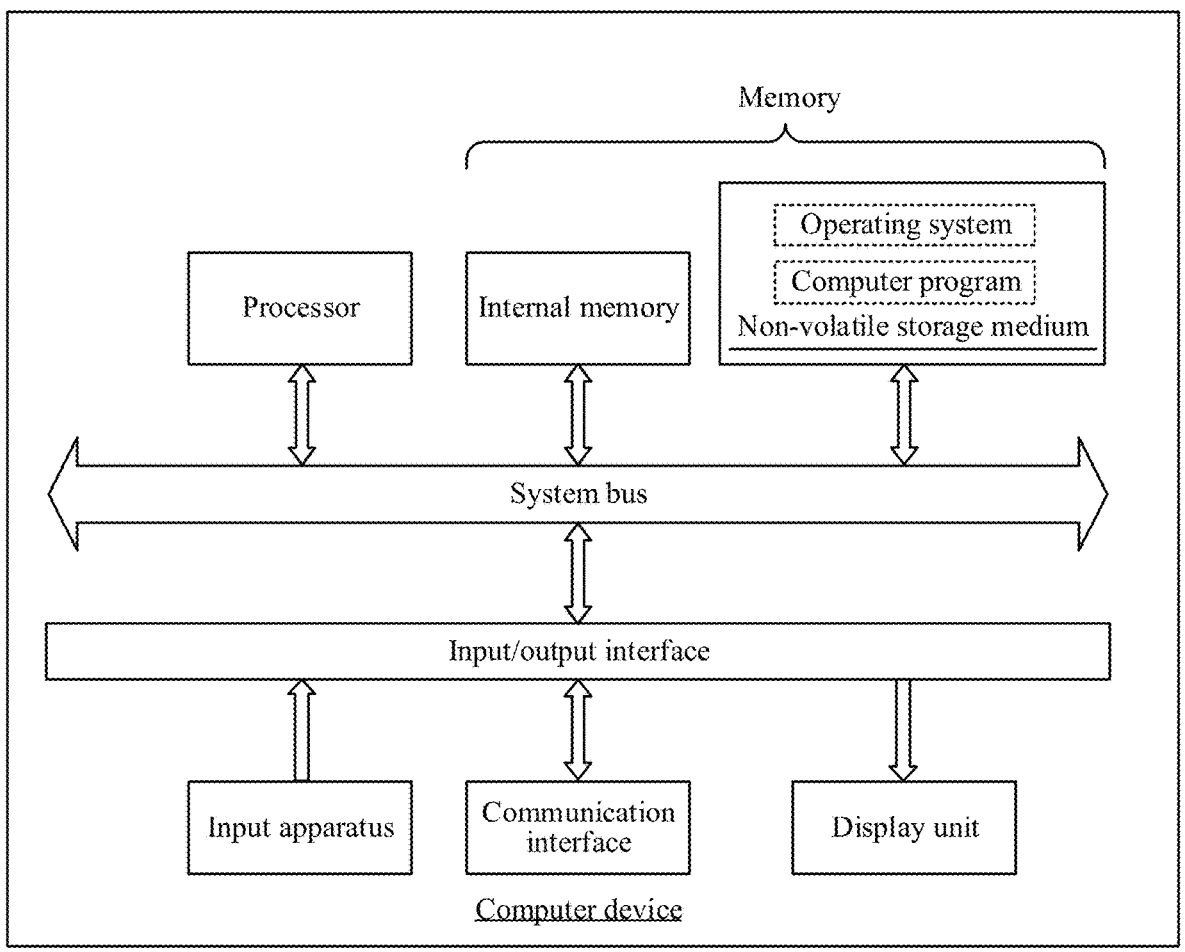
FIG. 10 is a diagram of an internal structure of a computer device according to another embodiment of the present disclosure.

A person skilled in the art may understand that, FIG. 9 and FIG. 10 are merely block diagrams of partial structures related to the solution of the present disclosure, and do not constitute a limitation to the computer device to which the solution of the present disclosure is applied. Specifically, the computer device may include more components or fewer components than those shown in the figure, or some components may be combined, or a different component arrangement may be used.

In an embodiment, a computer device is further provided, including a memory and one or more processors. The memory has computer-readable instructions stored therein. The one or more processors, when executing the computer-readable instructions, implement the operations in the foregoing method embodiments.

In an embodiment, one or more computer-readable storage media are provided, having computer-readable instructions stored therein. The computer-readable instructions, when executed by one or more processors, implement the operations in the foregoing method embodiments.

In an embodiment, a computer program product is further provided, including computer-readable instructions. The computer-readable instructions, when executed by one or more processors, implement the operations in the foregoing method embodiments.

The user information (including but not limited to user equipment information and personal user information) and data (including but not limited to data for analysis, stored data, and displayed data) involved in the present disclosure are all information and data authorized by the user or fully authorized by all parties. The collection, use, and processing of relevant data need to comply with the relevant laws, regulations, and standards of relevant countries and regions.

A person of ordinary skill in the art may understand that all or some processes of the methods in the foregoing embodiments may be implemented by computer-readable instructions by instructing relevant hardware. The computer-readable instructions may be stored in a non-volatile computer-readable storage medium. When the computer-readable instructions are executed, the processes of the foregoing method embodiments can be implemented. Any reference to the memory, the storage, the database, or other media used in the embodiments provided in the present disclosure may include at least one of a non-volatile memory and a volatile memory. The non-volatile memory may include a read-only memory (ROM), a magnetic tape, a floppy disk, a flash memory, an optical memory, or the like. The non-volatile memory may further include a random access memory (RAM) or an external cache. As a description rather than limitation, the RAM may have various forms, such as a static random access memory (SRAM) or a dynamic random access memory (DRAM).

The technical features of the foregoing embodiments may be combined in different manners to form various other embodiments. To make the description concise, not all possible combinations of the technical features in the foregoing embodiments are described. However, the combinations of these technical features are considered as falling within the scope recorded in this specification provided that no conflict exists.

The foregoing embodiments describe only some implementations of the present disclosure, which are described specifically and in detail, but cannot be construed as a limitation to the patent scope of the present disclosure. For a person of ordinary skill in the art, some transformations and improvements may be made without departing from the idea of the present disclosure. These transformations and improvements belong to the protection scope of the present disclosure. Therefore, the protection scope of the patent of the present disclosure is subject to the appended claims.

What is claimed is:

1. A log data query method, performed by a computer device, comprising:
   receiving a query request that queries, from a disk, log data matching a query time range, the disk being a hardware memory disk that stores data logs and a corresponding log query time tree, the log query time tree being a multi-branch search tree configured to record time ranges for log queries, wherein the log query time tree occupies fewer sectors of the disk than the data logs;
   in response to the query request, determining a target node matching the query time range from the log query time tree, a node in the log query time tree being configured to record a time range for a log query, wherein the target node is a node whose recorded time range intersects with the query time range;
   determining a target subtree from subtrees under the target node, the target subtree being configured to search for a boundary time value corresponding to the query time range;
   performing leaf node traversal from an edge leaf node of the target subtree, and stopping the leaf node traversal after a target leaf node is traversed, a time value, within a target time range recorded in the target leaf node, having corresponding log data in the disk, wherein the target time range recorded in the target leaf node including two endpoint time values;
   traversing time values in the target time range in a direction from one of the endpoint time values in the target time range recorded in the target leaf node toward another one of the endpoint time values in the target time range, to search a time value recorded in the target leaf node having corresponding log data and in a critical state, for obtaining the boundary time value corresponding to the query time range, comprising:
      performing, by using the first endpoint time value in the target time range recorded in the target leaf node as a starting time value of a current round and using the query time range as a target search range of the current round, log-time-value-search processing in the target search range starting from the starting time value, a log time value being a time value having the corresponding log data;
      updating, after the log time value is found by searching, the query time range based on the log time value, for obtaining an updated time range; and
      using the log time value as a starting time value of a next round of search, using the updated time range as a target search range of the next round, returning to performing the log-time-value-search processing in the target search range starting from the starting time value to perform the next round of search, until a search ending condition is satisfied, and using a last log time value found by searching as the time value recorded in the target leaf node having the corresponding log data and in the critical state, for obtaining the boundary time value corresponding to the query time range; and
   obtaining log data matching the query time range from the disk based on the boundary time value.

2. The method according to claim 1, wherein at least two subtrees are under the target node; and
   determining the target subtree from subtrees under the target node comprises:
   using, in response to an intersection being between the query time range and a time range recorded in one of the at least two subtrees under the target node, the subtree having the intersection as the target subtree.

3. The method according to claim 1, wherein the log query time tree comprises a binary log query time tree, the subtrees under the target node comprise a left subtree and a right subtree of the binary log query time tree, and the boundary time value comprises a lower boundary time value; and
   determining the target subtree from subtrees under the target node comprises:
   using the left subtree as the target subtree in response to the lower boundary time value needing to be searched for and an intersection being between the query time range and one or more of a time range recorded in the left subtree and a time range recorded in the right subtree; and
   performing the leaf node traversal from the edge leaf node of the target subtree, and stopping the leaf node traversal after the target leaf node is traversed comprises:
   performing leaf node traversal from a left edge leaf node of the left subtree, and stopping the leaf node traversal after the target leaf node is traversed.

4. The method according to claim 3, further comprising:
   performing leaf node traversal from a left edge leaf node of the right subtree and stopping the leaf node traversal after the target leaf node is traversed in response to the leaf node traversal being unperformed from the left subtree to the target leaf node.

5. The method according to claim 1, wherein the subtrees under the target node comprise a left subtree and a right subtree, and the boundary time value comprises an upper boundary time value; and
   the determining the target subtree from the subtrees under the target node comprises:
   using the right subtree as the target subtree in response to the upper boundary time value needing to be searched for and an intersection being between the query time range and one or more of a time range recorded in the left subtree and a time range recorded in the right subtree; and
   performing the leaf node traversal from the edge leaf node of the target subtree, and stopping the leaf node traversal after the target leaf node is traversed comprises:

performing leaf node traversal from a right edge leaf node of the right subtree, and stopping the leaf node traversal after the target leaf node is traversed.

6. The method according to claim 5, further comprising:
performing leaf node traversal from a right edge leaf node of the left subtree and stopping the leaf node traversal after the target leaf node is traversed in response to traversal being unperformed from the right subtree to the target leaf node.

7. The method according to claim 1, wherein the endpoint time value is a time value corresponding to an offset of a log data storage file in the disk to which the target leaf node points; and
performing the log-time-value-search processing in the target search range starting from the starting time value comprises:
updating, by using the time value corresponding to the offset as the starting time value of the current round and using the query time range as the target search range of the current round, the offset of the data storage file in the disk to which the target leaf node points starting from the starting time value, to perform the log-time-value-search processing in the target search range.

8. The method according to claim 1, wherein updating, after the log time value is found by searching, the query time range based on the log time value, for obtaining the updated time range comprises:
updating an upper limit value of the query time range by using the log time value to obtain the updated time range during searching for a lower boundary time value corresponding to the query time range.

9. The method according to claim 1, wherein updating, after the log time value is found by searching, the query time range based on the log time value, for obtaining the updated time range comprises:
updating a lower limit value of the query time range by using the log time value to obtain the updated time range during searching for an upper boundary time value corresponding to the query time range.

10. The method according to claim 1, wherein the search ending condition comprises that time values in the target time range are traversed or that a quantity of times for preforming the log-time-value-search processing reaches at least one of preset search quantities.

11. The method according to claim 1, wherein the boundary time value comprises a lower boundary time value and an upper boundary time value; and obtaining the log data matching the query time range from the disk based on the boundary time value comprises:
obtaining log data corresponding to log data numbers within a target number range from the disk as the log data matching the query time range,
the target number range being a number range formed by using a log data number corresponding to the lower boundary time value as a starting value of the range and using a log data number corresponding to the upper boundary time value as an ending value of the range.

12. A computer device, comprising a memory and one or more processors, the memory containing computer-readable instructions that, when being executed, causes the one or more processors to perform:
receiving a query request that queries, from a disk, log data matching a query time range, the disk being a hardware memory disk that stores data logs and a corresponding log query time tree, the log query time tree being a multi-branch search tree configured to record time ranges for log queries, wherein the log query time tree occupies fewer sectors of the disk than the data logs;
in response to the query request, determining a target node matching the query time range from the log query time tree, a node in the log query time tree being configured to record a time range for a log query, wherein the target node is a node whose recorded time range intersects with the query time range;
determining a target subtree from subtrees under the target node, the target subtree being configured to search for a boundary time value corresponding to the query time range;
performing leaf node traversal from an edge leaf node of the target subtree, and stopping the leaf node traversal after a target leaf node is traversed, a time value, within a target time range recorded in the target leaf node, having corresponding log data in the disk, wherein the target time range recorded in the target leaf node including two endpoint time values;
traversing time values in the target time range in a direction from one of the endpoint time values in the target time range recorded in the target leaf node toward another one of the endpoint time values in the target time range, to search a time value recorded in the target leaf node having corresponding log data and in a critical state, for obtaining the boundary time value corresponding to the query time range, comprising:
performing, by using the first endpoint time value in the target time range recorded in the target leaf node as a starting time value of a current round and using the query time range as a target search range of the current round, log-time-value-search processing in the target search range starting from the starting time value, a log time value being a time value having the corresponding log data;
updating, after the log time value is found by searching, the query time range based on the log time value, for obtaining an updated time range; and
using the log time value as a starting time value of a next round of search, using the updated time range as a target search range of the next round, returning to performing the log-time-value-search processing in the target search range starting from the starting time value to perform the next round of search, until a search ending condition is satisfied, and using a last log time value found by searching as the time value recorded in the target leaf node having the corresponding log data and in the critical state, for obtaining the boundary time value corresponding to the query time range; and
obtaining log data matching the query time range from the disk based on the boundary time value.

13. The device according to claim 12, wherein at least two subtrees are under the target node; and the one or more processors are further configured to perform:
using, in response to an intersection being between the query time range and a time range recorded in one of the at least two subtrees under the target node, the subtree having the intersection as the target subtree.

14. The device according to claim 12, wherein the log query time tree comprises a binary log query time tree, the subtrees under the target node comprise a left subtree and a right subtree of the binary log query time tree, and the boundary time value comprises a lower boundary time value; and the one or more processors are further configured to perform:

using the left subtree as the target subtree in response to the lower boundary time value needing to be searched for and an intersection being between the query time range and one or more of a time range recorded in the left subtree and a time range recorded in the right subtree; and performing leaf node traversal from a left edge leaf node of the left subtree, and stopping the leaf node traversal after the target leaf node is traversed.

15. The device according to claim 14, wherein the one or more processors are further configured to perform:

performing leaf node traversal from a left edge leaf node of the right subtree and stopping the leaf node traversal after the target leaf node is traversed in response to the leaf node traversal being unperformed from the left subtree to the target leaf node.

16. The device according to claim 12, wherein the subtrees under the target node comprise a left subtree and a right subtree, and the boundary time value comprises an upper boundary time value; and the one or more processors are further configured to perform:

using the right subtree as the target subtree in response to the upper boundary time value needing to be searched for and an intersection being between the query time range and one or more of a time range recorded in the left subtree and a time range recorded in the right subtree; and performing leaf node traversal from a right edge leaf node of the right subtree, and stopping the leaf node traversal after the target leaf node is traversed.

17. The device according to claim 16, wherein the one or more processors are further configured to perform:

performing leaf node traversal from a right edge leaf node of the left subtree and stopping the leaf node traversal after the target leaf node is traversed in response to traversal being unperformed from the right subtree to the target leaf node.

18. A non-transitory computer-readable storage medium, containing computer-readable instructions, that when being executed causes one or more processors to perform:

receiving a query request that queries, from a disk, log data matching a query time range, the disk being a hardware memory disk that stores data logs and a corresponding log query time tree, the log query time tree being a multi-branch search tree configured to record time ranges for log queries, wherein the log query time tree occupies fewer sectors of the disk than the data logs;

in response to the query request, determining a target node matching the query time range from the log query time tree, a node in the log query time tree being configured to record a time range for a log query, wherein the target node is a node whose recorded time range intersects with the query time range;

determining a target subtree from subtrees under the target node, the target subtree being configured to search for a boundary time value corresponding to the query time range;

performing leaf node traversal from an edge leaf node of the target subtree, and stopping the leaf node traversal after a target leaf node is traversed, a time value, within a target time range recorded in the target leaf node, having corresponding log data in the disk, wherein the target time range recorded in the target leaf node including two endpoint time values;

traversing time values in the target time range in a direction from one of the endpoint time values in the target time range recorded in the target leaf node toward another one of the endpoint time values in the target time range, to search a time value recorded in the target leaf node having corresponding log data and in a critical state, for obtaining the boundary time value corresponding to the query time range, comprising:

performing, by using the first endpoint time value in the target time range recorded in the target leaf node as a starting time value of a current round and using the query time range as a target search range of the current round, log-time-value-search processing in the target search range starting from the starting time value, a log time value being a time value having the corresponding log data;

updating, after the log time value is found by searching, the query time range based on the log time value, for obtaining an updated time range; and using the log time value as a starting time value of a next round of search, using the updated time range as a target search range of the next round, returning to performing the log-time-value-search processing in the target search range starting from the starting time value to perform the next round of search, until a search ending condition is satisfied, and using a last log time value found by searching as the time value recorded in the target leaf node having the corresponding log data and in the critical state, for obtaining the boundary time value corresponding to the query time range; and obtaining log data matching the query time range from the disk based on the boundary time value.

* * * * *